United States Patent Office 3,432,520
Patented Mar. 11, 1969

3,432,520
PREPARATION OF 2-IMIDAZOLONE DERIVATIVES BY CATALYTIC CYCLIZATION
Enos Charles Pesterfield, Jr., Briarcliff Manor, N.Y., assignor to Geigy Chemical Corporation, Greenburgh, N.Y., a corporation of Delaware
No Drawing. Filed Sept. 1, 1965, Ser. No. 484,474
U.S. Cl. 260—309.6      10 Claims
Int. Cl. C07d 49/34; C07c 127/16

ABSTRACT OF THE DISCLOSURE 1,5-substituted-2-imidazolones optionally substituted in the 4-position are prepared from N-mono-substituted-N'-propargyl ureas under basic conditions. The compounds are useful as analgesics, antipyretics, anti-inflammatories, and CNS depressants.

---

This invention relates to the production of 1,4,5-substituted-2-imidazolones and is more particularly concerned with the production of such compounds by cyclization and rearrangement of N-monosubstituted-N'-propargyl ureas with concomitant double-bond isomerization.

The preparation of various 2-imidazolone derivatives by use of assorted catalytic methods is shown in the prior art. Thus, as described in Japanese Patent 12,940 published July 8, 1964, 3-butynylurea or propargylurea is treated with a concentrated strong acid (e.g., $H_2SO_4$) to bring about ring closure and produce 2-imidazolone derivatives having the formula $$R-C=\!\!=\!\!C-CH_2$$
$$\underset{HN}{\phantom{R-C}}\underset{NH}{\phantom{=C-CH_2}}$$
$$\underset{C}{\phantom{HN\quad NH}}$$
$$\underset{\|}{\phantom{C}}$$
$$O$$

in which R is H or $CH_3$. Similarly, Stoffel and Speziale have described a series of ring closures by treating various substituted propynylureas with phosphorous pentachloride, Jour. Org. Chem. 27, 3079 (1962). This latter publication aptly emphasizes the unpredicability of these catalytic reactions, by pointing out (p. 3080) that the reactions are general except that, when one of the N atoms of the urea group is unsubstituted, ring closure is not obtained.

Many of these cyclization reactions described in the prior art are essentially laboratory processes which are not suitable for commercial adaptation even though relatively high yields of the desired products may sometimes be obtained. It is well known that, in such catalytic operations, maximum yield is not always the major consideration for practical large-scale use. More frequently, moderate to good yields are more economically sound, from a commercial standpoint, dependent on cost and availability of raw materials, nature and conditions of operations, recovery of finished products and the like.

The present invention provides a rapid and cheap process for the commercial synthesis of 1,4,5-substituted-2-imidazolones by cyclization of N-monosubstituted-N'-1,3-substituted propargyl ureas by an alkali metal base, particularly alkali metal hydroxides and alkoxides, as the catalyst and carrying out the reaction in suitable solvent.

The reaction proceeds according to the following equation:

$$\underset{(I)}{\underset{R_3-NH\quad NH}{\underset{\underset{O}{\|}}{\underset{C}{\phantom{X}}}}\underset{CH-R_1}{\overset{R_2-C\equiv C}{\phantom{XXX}}}} \xrightarrow{cat.} \underset{(II)}{\underset{R_3-N\quad NH}{\underset{\underset{O}{\|}}{\underset{C}{\phantom{X}}}}\underset{\phantom{X}}{\overset{R_2-CH_2-C=\!\!=\!\!C-R_1}{\phantom{XXX}}}}$$

in which $R_1$=H or lower alkyl, $R_2$=H or lower alkyl and $R_3$=aliphatic, cycloalkyl, aralkyl or aryl groups. More specifically, in compounds of Formulas I and II, $R_3$ is an aliphatic group, such as, an alkyl group having up to 12 carbon atoms, viz., methyl, ethyl, n-propyl, isopropyl, n-butyl, n-hexyl, n-octyl, n-dodecyl, etc., or a lower alkenyl group, such as, vinyl, allyl, methallyl, etc., or an $\omega,\omega$-di(lower) alkoxy(lower)alkylene group, such as, dimethoxyethyl, dimethoxypropyl, bisethoxyethyl, bisethoxypropyl, etc., or an $\omega$-amino-(lower)alkyl group, such as, a di(lower)alkylamino(lower)alkyl group, viz., dimethylaminoethyl, diethylaminopropyl, etc., or an N-heterocyclic substituted (lower)alkyl group, viz., 2-(N-hexamethyleneimino)ethyl, 3-(N-pyrrolidino)propyl, 2-(N-piperidino)ethyl, etc.; or a cycloalkyl group, such as, cyclopentyl, cyclohexyl, but also cycloheptyl, etc.; or an aralkyl group, such as, benzyl, phenethyl, phenpropyl, etc., or an aryl group, such as, phenyl, biphenyl or naphthyl, etc. These arakyl or aryl groups can carry, for example, from one to three of the following ring substituents: halogen, such as, fluorine, chlorine or bromine; trifluoromethyl; lower alkyl; lower alkenyl; lower alkoxy(lower)alkyl; hydroxy; lower alkoxy, preferably, methoxy; carboxy; lower carbalkoxy; lower alkanoyl, preferably acetyl; lower acyloxy, preferably acetoxy; cyano; nitro; amino; lower acylamido, preferably acetamido; lower dialkylamino; lower dialkylamino(lower)alkyl or lower alkylmercapto. A methylenedioxy substituent is also within the purview of the inventive concept.

The term "lower" as used herein in connection with definitions of substituents, signifies that the groups in question have a carbon content of $C_1$ to $C_6$ and are inclusive of straight chains and branched chains.

The following examples are typical of the reactions which are not limited to the specific details set forth. Throughout the specification, temperatures are centigrade.

Example 1.—1-(p-methoxyphenyl)-5-methyl-2-imidazolone

A solution of propargyl amine (15.0 g.) in dry benzene (50 ml.) was added dropwise to a stirred solution of p-methoxyphenyl isocyanate (40.5 g.) in dry benzene (100 ml.). After the addition was complete an additional portion of benzene (50 ml.) was added and the reaction mixture was stirred for one hour. The collected and washed (benzene) precipitate was dried in vacuo to yield the intermediate N-(p-methoxyphenyl)-N'-propargyl urea. A mixture of the urea (25.0 g.) and sodium methoxide (500 mg.) in dry benzene (300 ml.) was refluxed for 44 hours. Upon cooling, the reaction mixture deposited crystals which upon recrystallization from ethanol afforded 1-(p-methoxyphenyl)-5-methyl-2-imidazolone as white crystals, M.P. 194–195.5°.

Example 2.—5-methyl-1-phenyl-2-imidazolone

A solution of phenyl isocyanate (20.0 g.) in dry benzene (50 ml.) was added dropwise to a well stirred solution of propargylamine (9.25 g.) in dry benzene (50 ml.). After a period of ¾ hour at reflux, the reaction mixture was cooled, the deposited product was collected and washed with a little benzene and then was dried to give the intermediate N-phenyl-N'-propargyl urea. A mixture of the urea (17.1 g.), sodium methoxide (350 mg.) and dry benzene (200 ml.) was refluxed for 18 hours. The reaction mixture was then cooled and the deposited product was recrystallized from ethanol to yield 5-methyl-1-phenyl-2-imidazolone as white crystals, M.P. 214.5–216°.

Example 3.—5-methyl-1-(p-tolyl)-2-imidazolone

A solution of propargyl amine (18.5 g.) in toluene (100 ml.) was added dropwise to a solution of p-tolyl isocyanate (44.7 g.) in toluene (250 ml.) at room temperature. When the addition was complete, the reaction mixture was heated on the steam bath for 30 minutes. After dilution with toluene (400 ml.) and addition of sodium methoxide (1.32 g.), the reaction mixture was refluxed for 18 hours; it was then cooled and concentrated under reduced pressure. Crystallization of the residue from ethyl acetate gave 5-methyl-1-(p-tolyl)-2-imidazolone as slightly yellow crystals, M.P. 197–198°.

Example 4.—5-methyl-1-(n-propyl)-2-imidazolone

A solution of propargyl amine (18.3 g.) in toluene (100 ml.) was added dropwise to a solution of n-propyl isocyanate (28.3 g.) in toluene (100 ml.); then reaction mixture was refluxed for 30 minutes. After dilution with an additional portion of toluene (400 ml.) and addition of sodium methoxide (1.0 g.) the reaction mixture was refluxed for 18 hours. The residue obtained upon concentration of the reaction mixture was crystallized from hexane to give 5-methyl-1-(n-propyl)-2-imidazolone as white crystals, M.P. 103–105°.

Example 5.—5-methyl-1-(m-nitrophenyl)-2-imidazolone

A solution of propargyl amine (12.0 g.) in toluene (50 ml.) was added dropwise to a solution of m-nitrophenyl isocyanate (35.8 g.) in toluene (250 ml.). After the addition was complete, the reaction mixture was refluxed for 30 minutes, then diluted to 600 ml. with additional toluene. Sodium methoxide (1.0 g.) was added and reflux continued for 72 hours. The residue obtained upon concentration of the reaction mixture was crystallized from methanol to give 5-methyl-1-(m-nitrophenyl)-2-imidazolone, M.P. 205–208°.

Example 6.—1-(p-fluorophenyl)-5-methyl-2-imidazolone

A solution of propargyl amine (15.0 g.) in benzene (100 ml.) was added dropwise to a stirred solution of p-fluorophenyl isocyanate (37.6 g.) in benzene (100 ml.). The reaction mixture was heated at reflux for 30 minutes, then diluted to 600 ml. with additional benzene, sodium methoxide added and reflux continued for 24 hours. The residue obtained upon concentration of the reaction mixture afforded, after crystallization from isopropanol/chloroform, 1-(p-fluorophenyl)-5-methyl-2-imidazolone as white crystals, M.P. 222–224°.

Example 7.—1-(n-butyl)-5-methyl-2-imidazolone

A solution of propargyl amine (20.0 g.) in benzene (100 ml.) was added dropwise to a stirred solution of n-butyl isocyanate (36.0 g.) in benzene (200 ml.), and the reaction mixture was refluxed for 30 minutes. After dilution to 600 ml. with additional benzene and addition of sodium methoxide (1.0 g.) the reaction was continued at reflux for 20 hours. The residue obtained upon concentration of the reaction mixture was crystallized from cyclohexane to give 1-(n-butyl)-5-methyl-2-imidazolone as white crystals, M.P. 107–108°.

Example 8.—5-methyl-1-(p-trifluoromethylphenyl)-2-imidazolone

A solution of propargyl amine (12.0 g.) in toluene (100 ml.) was added dropwise to a stirred solution of p-trifluoromethylphenyl isocyanate (40.7 g.) in benzene (200 ml.). After the addition was complete and an additional period of 30 minutes at reflux, the reaction mixture was diluted to 600 ml. with benzene, sodium ethoxide (1.2 g.) was added, and the reaction was allowed to continue at reflux for 24 hours. The residue obtained upon concentration of the reaction mixture was crystallized from isopropanol to give 5-methyl-1-(p-trifluoromethylphenyl)-2-imidazolone as white crystals, M.P. 209–211°.

Example 9.—1-(p-ethoxyphenyl)-5-methyl-2-imidazolone

A solution of propargyl amine (13.5 g.) in benzene (100 ml.) was added dropwise to a stirred solution of p-ethoxyphenyl isocyanate (40.0 g.) in benzene (200 ml.); then the reaction mixture was refluxed for 30 minutes. After dilution to 600 ml. with benzene and addition of sodium methoxide (1.0 g.), the reaction mixture was refluxed for 24 hours. Concentration of the mixture and crystallization of the residue from ethanol gave 1-(p-ethoxyphenyl)-5-methyl-2-imidazolone as white crystals, M.P. 189–191°.

Example 10.—1-(p-chlorophenyl)-5-methyl-2-imidazolone

A solution of propargyl amine (18.0 g.) in toluene (100 ml.) was added dropwise to a stirred solution of p-chlorophenyl isocyanate (50.0 g.) in toluene (300 ml.) and the reaction mixture refluxed for 30 minutes. After dilution to 750 ml. with additional toluene and addition of sodium methoxide, the reaction mixture was refluxed for 24 hours. The residue obtained upon removal of solvent was crystallized from ethanol to give 1-(p-chlorophenyl)-5-methyl-2-imidazolone as white crystals, M.P. 186–188°.

Example 11.—4,5-dimethyl-1-(p-methoxyphenyl)-2-imidazolone

A solution of 3-amino-1-butyne (10.0 g.) in benzene (50 ml.) was added dropwise to a solution of p-methoxyphenyl isocyanate (21.6 g.) in benzene (100 ml.); and the reaction mixture refluxed for 30 minues. After dilution to 500 ml. with additional benzene and addition of sodium methoxide (0.7 g.), the resulting reaction mixture was refluxed for 24 hours. The product obtained upon concentration of the reaction mixture gave, after crystallization from methanol, 4,5-dimethyl-1-(p-methoxyphenyl)-2-imidazolone as white crystals, M.P. 243–245°.

Example 12.—1-(n-butyl)-5-ethyl-2-imidazolone

A solution of 1-amino-2-butyne (14.0 g.) in benzene (75 ml.) was added dropwise to a stirred solution of n-butyl isocyanate (20.0 g.) in benzene (200 ml.) and the reaction mixture refluxed for 30 minutes. After dilution to 500 ml. with additional benzene and addition of sodium methoxide (0.85 g.), the reaction mixture was refluxed for 24 hours. The residue obtained by concentration of the reaction mixture upon distillation in vacuo gave 1-n-butyl-5-ethyl-2-imidazolone as white crystals, B.P. 142–143°/0.1 mm., M.P. 52–55°.

Example 13.—1-(p-methoxyphenyl)-5-methyl-2-imidazolone

A mixture of N(p-methoxyphenyl)-N'-propargyl urea (10.0 g.) in aqueous sodium hydroxide (100 ml., 0.5 N) was heated at reflux for 18 hours. The product deposited upon cooling the reaction mixture was crystallized from ethanol to give 1-(p-methoxyphenyl)-5-methyl-2-imidazolone as white crystals, M.P. 193–195°.

Similarly, other corresponding 1,4,5-substituted-2-imidazolones (II) are obtained when other N-monosubstituted-N'-1,3-substituted propargyl ureas (I) are used in place of the substituted propargyl ureas of the examples.

The cyclization reactions of this invention proceed smoothly and are easily controlled. The N'-substituted-N-1,3-substituted propargyl ureas are simply and cheaply prepared. Typically, as illustrated, a suitably substituted propargylamine is readily condensed with a suitable substituted isocyanate, in solution in suitable solvent to form the desired substituted propargyl urea which may be cyclized as described herein, without separation from the solvent. All of these factors contribute to provide an economical process suitable for large scale commercial operation in readily available equipment, with minimum controls.

The specific details of the present process are subject to considerable variation without departing from the scope and spirit of the invention. Thus, the ratio of the amount of catalyst to the amount of the substituted propargyl urea may range from about 1:5 to about 1:100 with about 1:50 being preferred. Instead of crystallizing the desired product from benzene, one may use ethanol, methanol, xylene, toluene, chlorobenzene, halogenated hydrocarbons such as chloroform, ethers such as diisopropyl ether, water and the like as the crystallization solvent.

The cyclization catalysts used in the present process may be represented by the formula

ROM in which R is hydrogen or an alkyl group having 1–4 C atoms (e.g., methyl, ethyl, propyl, tert. butyl, etc.) and M is an alkali metal (e.g., sodium, potassium, lithium, etc.).

The cyclization reaction is preferably carried out in a suitable solvent as the reaction medium, as shown in the examples. Suitable solvents include benzene, toluene, xylene, water, lower alkanols, e.g., methanol, ethanol and the like. If desired, the solvent may be used as a recrystallization medium for obtaining the purified end product.

The 1,4,5-substituted-2-imidazolones prepared in accordance with the present process possess valuable pharmacological properties and have been found to be useful as analgesics, antipyretics, anti-inflammatories, CNS depressants and the like. This class of compounds and the use of them as pharmaceutical agents and intermediates in the synthesis of drugs has been described in the prior art.

The invention is subject to other suitable changes without departing from the spirit and scope thereof as defined in the appended claims.

What is claimed is:

1. The process for the preparation of a substituted-2-imidazolone having the formula

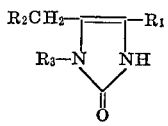

wherein
$R_1$ is hydrogen or (lower) alkyl having from 1 to 6 carbon atoms $R_2$ is hydrogen or lower alkyl having from 1 to 6 carbon atoms, and $R_3$ is (lower)alkyl having from 1 to 6 carbon atoms, phenyl or phenyl substituted by halogen, lower alkyl, lower alkoxy, nitro, lower alkylmercapto or methylenedioxy which comprises heating a solution of a N-mono-substituted-N'-1,3-substituted propargyl urea having the formula

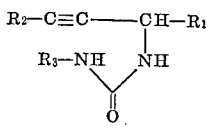

in a suitable solvent containing a catalytic amount of an alkali metal hydroxide or alkali metal alkoxide in an amount of between about $\frac{1}{100}$ to about $\frac{1}{25}$ of the amount of the urea until cyclization is substantially complete.

2. The process of claim 1 in which the catalyst has the formula

ROM in which R is hydrogen or an alkyl group having 1–4 C atoms and M is an alkali metal.

3. The process of claim 1 in which the catalyst is sodium methoxide.

4. The process of claim 1 in which the catalyst:urea ratio is about 1:50.

5. The process of claim 1 in which the solvent is benzene.

6. The process of claim 1 in which $R_3$ is phenyl and $R_1$ and $R_2$ are H.

7. The process of claim 1 in which $R_3$ is p-methoxyphenyl and $R_1$ and $R_2$ are H.

8. The process of claim 1 in which $R_3$ is butyl and $R_1$ and $R_2$ are hydrogen.

9. The process of claim 1 in which $R_3$ is methoxyphenyl and $R_1$ is methyl and $R_2$ is hydrogen.

10. The process of claim 1 in which $R_3$ is butyl, $R_1$ is hydrogen and $R_2$ is methyl.

References Cited

UNITED STATES PATENTS 3,136,776  6/1964  Stoffel _____ 260—309.6

FOREIGN PATENTS 12,940  7/1964  Japan.

OTHER REFERENCES

Stoffel et al.: Jour. Org. Chem., vol. 27, pp. 3079–83 (1962).

HENRY R. JILES, *Primary Examiner.*

N. TROUSOF, *Assistant Examiner.*

U.S. Cl. X.R.

260—239, 294, 326.3, 553, 999